United States Patent [19]
Carter et al.

[11] Patent Number: 5,651,802
[45] Date of Patent: *Jul. 29, 1997

[54] FLUID FILTER FOR SEPARATING ENTRAINED PARTICULATE MATTER FROM A MOVING FLUID STREAM

[75] Inventors: Jerry T. Carter, Charlotte; Josef Rutishauser, Winston Salem, both of N.C.

[73] Assignee: Luwa AG, Zurich, Switzerland

[ * ] Notice: The term of this patent shall not extend beyond the expiration date of Pat. No. 5,453,117.

[21] Appl. No.: 528,927

[22] Filed: Sep. 15, 1995

Related U.S. Application Data

[63] Continuation of Ser. No. 215,739, Mar. 22, 1994, Pat. No. 5,453,117.

[51] Int. Cl.⁶ ............................................. B01D 46/04
[52] U.S. Cl. .......................... 55/294; 55/484; 55/485; 95/279
[58] Field of Search ............................ 55/498, 484, 485, 55/294, 301; 95/278, 279, 286

[56] References Cited

U.S. PATENT DOCUMENTS

| | | | |
|---|---|---|---|
| 2,406,931 | 9/1946 | Troxler | 55/484 |
| 3,217,470 | 11/1965 | Omohundro | 55/484 |
| 3,420,377 | 1/1969 | Vandersip | 55/484 |
| 3,499,267 | 3/1970 | King, Jr. et al. | 55/294 |
| 3,630,380 | 12/1971 | Barnebi | 210/404 |
| 3,887,344 | 6/1975 | Smith | 55/294 |
| 4,289,510 | 9/1981 | Herndon, Jr. | 55/294 |
| 4,360,369 | 11/1982 | Niederer | 55/283 |
| 4,364,755 | 12/1982 | Ferri | 55/294 |
| 4,551,248 | 11/1985 | Lenac | 210/404 |
| 4,725,292 | 2/1988 | Williams | 55/294 |
| 5,114,444 | 5/1992 | Stuble | 55/294 |
| 5,271,838 | 12/1993 | Rahimi et al. | 55/484 |
| 5,453,117 | 9/1995 | Carter et al. | 55/484 |

FOREIGN PATENT DOCUMENTS

| | | | |
|---|---|---|---|
| 457603 | 1/1913 | France | 55/294 |
| 3900476 | 1/1990 | Germany | 95/279 |
| 55-160244 | 12/1980 | Japan | 55/294 |

*Primary Examiner*—Jay H. Woo
*Assistant Examiner*—Duane S. Smith
*Attorney, Agent, or Firm*—Adams Law Firm, P.A.

[57] ABSTRACT

A fluid filter is provided for separating entrained particulate matter from a moving fluid stream. The fluid filter includes a filter structure for mounting the filter on a supporting surface, a plurality of nested filter frames, and a filtration medium carried by each of the filter frames. The filter structure has a fluid inlet and a fluid outlet for conveying the fluid stream therethrough. The nested filter frames are located within the filter structure in spaced-apart relation to each other. The filtration media are interposed between the fluid inlet and the fluid outer of the filter structure, and define on one side thereof an upstream filter surface and on the other side thereof a downstream filter surface.

13 Claims, 14 Drawing Sheets

FLUID FILTER FOR SEPARATING ENTRAINED PARTICULATE MATTER FROM A MOVING FLUID STREAM

This application is a continuation application of U.S. Ser. No. 08/215,739, filed Mar. 22, 1994 and issued as U.S. Pat. No. 5,453,117 on Sep. 26, 1995.

TECHNICAL FIELD AND BACKGROUND OF THE INVENTION

This invention relates to a fluid filter and method of separating entrained particulate matter from a moving fluid stream, such as air. The present invention is best utilized in spacious, enclosed environments, such as textile processing and yarn manufacturing plants, where the quality of air must be periodically monitored and continuously improved by filtration.

As a result of financial, environmental, and health-related concerns, proper air filtration in work facilities has become a high priority. A substantial portion of dust, lint, and other particulate matter entrained in the air stream can be removed from the air stream by filtration, thus allowing conditioned air to be cleaned and recycled back into the work place. The recycling of conditioned air substantially reduces the cost of heating and cooling the facility. Moreover, proper air filtration reduces the costs associated with frequent cleaning and necessary repair of machines exposed to unclean air environments. Cleaner machines produce a better quality product and require less maintenance. In addition, proper air filtration provides a healthier work environment, and reduces discharge of unclean air from the work place to the atmosphere.

Prior air filtration methods and devices of the past suffer from drawbacks, such as low filtering capacity and efficiency. Government agencies such as OSHA and the EPA have established guidelines and minimum standards of air quality which must be met by many industrial and commercial companies, both large and small. This heightened awareness has increased the need for efficient and effective means of cleaning the air within industrial and commercial settings.

The present invention addresses the problems of prior art filters by providing a single stage fluid filter which is relatively small with high filtering capacity and efficiency. The invention includes a large surface area of filtration media, and a cleaning device for periodically cleaning the filtration media.

SUMMARY OF THE INVENTION

Therefore, it is an object of the invention to provide a single stage fluid filter for separating entrained particulate matter from a conveying fluid stream, such as gas or liquid.

It is another object of the invention to provide a single stage fluid filter which includes several spaced-apart and nested tubular filtration media carried in a filter structure for receiving and filtering a moving fluid stream.

It is another object of the invention to provide a filter which includes several annular, nested filter frames for attaching respective filtration media thereon in filtering relation to the moving fluid stream.

It is another object of the invention to provide a fluid filter including a filter cleaning device for constantly cleaning the filtration media to increase the filtering capacity of the filter.

It is another object of the invention to provide a fluid filter including a filter cleaning device which cleans the filtration media intermittently based upon a predetermined drop of fluid pressure from the upstream filter surface to the downstream filter surface.

It is another object of the invention to provide a fluid filter including a filter cleaning device which cleans the filtration media on a programmed cycle timer basis.

It is another object of the invention to provide a fluid filter of relatively even efficiency.

It is another object of the invention to provide a fluid filter which is relatively small in relation to filters of comparable filtering capacity and efficiency.

These and other objects of the present invention are achieved in the preferred embodiments disclosed below by providing a fluid filter for separating entrained particulate matter from a moving fluid stream. The fluid filter includes a filter structure for mounting the filter on a supporting surface, a plurality of nested filter frames, and a filtration medium carried by each of the filter frames.

The filter structure includes a fluid inlet zone and a fluid outlet zone for conveying the fluid stream therethrough. The nested filter frames are located within the filter structure in spaced-apart relation to each other. The filtration media are interposed between the fluid inlet zone and the fluid outlet zone of the filter structure, and define on one side thereof an upstream filter surface and on the other side thereof a downstream filter surface. Each filtration medium receives the fluid to be filtered therethrough from the upstream filter surface to the downstream filter surface, and accumulates an overlying layer of particulate matter on the upstream filter surface.

Preferably, a filter cleaning device cleans the overlying layer of particulate matter from the upstream filter surface of the filtration medium.

According to one preferred embodiment of the invention, the plurality of filter frames comprises a plurality of radially-spaced concentric drums nested together and positioned in fluid receiving relation to the fluid inlet zone of the filter structure. Each of the filter frames are defined by an annular front peripheral edge of one of the drums and an annular back peripheral edge of an adjacent one of the drums.

According to another preferred embodiment of the invention, each of the plurality of drums includes a radially extending annular flange located on the back peripheral edge thereof for attaching one end of the filtration medium thereto.

According to yet another preferred embodiment of the invention, each of the plurality of drums is conical having a slightly smaller diameter front end relative to the back end thereof.

Preferably, the filtration medium is a tubular cell, and extends along the length of the respective drums. The filtration medium is attached at one end to the annular front peripheral edge of one of the drums, and is attached at the opposite end to the annular flange located at the back peripheral edge of the adjacent one of the drums.

According to another preferred embodiment of the invention, fluid pumping means communicates with the fluid outlet zone of the filter structure, and creates a negative suction flow of fluid for driving the moving fluid stream through the filter structure from the fluid inlet zone to the fluid outlet zone thereof.

According to yet another preferred embodiment of the invention, the cleaning device includes suction means and an elongated manifold. The suction means creates a negative flow of fluid, or suction, relative to the moving fluid stream.

The elongated manifold communicates with the suction means, and is located in the fluid inlet zone of the filter structure. The manifold has at least one outwardly extending tube attached thereto. The at least one tube penetrates the filter structure and operatively engages the upstream filter surface of the filtration medium to clean the filtration medium, and thereby increase the fluid flow through the filtration medium from the upstream filter surface to the downstream filter surface.

According to another preferred embodiment of the invention, the cleaning device further includes actuating means carried by the filter structure and operatively associated with the manifold. The actuating means operates to move the at least one tube relative to the filtration medium.

According to yet another preferred embodiment of the invention, the manifold has an axis of rotation, and the actuating means includes rotating means. The rotating means is located at the axis of rotation, and is operatively associated with the manifold for providing rotational movement of the at least one tube about the circumference of the filtration medium to be cleaned.

According to yet another preferred embodiment of the invention, the actuating means further includes reciprocating means. The reciprocating means is operatively associated with the manifold for providing reciprocating movement of the at least one tube along the length of the filtration medium to be cleaned.

According to yet another preferred embodiment of the invention, the manifold includes two tubes attached thereto for cleaning each filtration medium. The tubes are spaced-apart along the length of the manifold a distance corresponding generally to the diameter of the filtration medium to be cleaned. Thus, an entire circumferential portion of the filtration medium is cleaned upon 180 degree rotation of the manifold about the axis of rotation.

According to yet another preferred embodiment of the invention, each of the two tubes includes a nozzle attached thereto at a free end thereof. The nozzle has an opening formed therein for engaging the upstream filter surface of the filtration medium to clean the filtration medium. The opening defines a zone of accelerated negative fluid flow for increasing the cleaning efficiency of the respective tubes.

According to yet another preferred embodiment of the invention, the manifold includes a first, relatively long tube for cleaning a first half of the filtration medium, and a second, relatively short tube for cleaning a second half of the filtration medium. Thus, the two tubes and corresponding nozzles cooperate with the rotating means and the reciprocating means to collectively clean in a spiral pattern the entire upstream filter surface of the filtration medium.

An embodiment of the method according to the invention includes the step of providing a filter structure including a fluid inlet zone and a fluid outlet zone. Another step includes locating a plurality of nested, spaced-apart filtration media within the filter structure in filtering relation to the fluid inlet zone of the filter structure. Yet another step includes driving the moving fluid stream through the filter structure, and through the filtration media from an upstream filter surface to a downstream filter surface thereof. Thus, an overlying layer of particulate matter accumulates on the upstream filter surface of the filtration media. A filter cleaning step includes cleaning the upstream filter surface of the filtration media to decrease the fluid pressure drop from the upstream filter surface to the downstream filter surface.

According to another preferred embodiment of the invention, the method includes the step of locating a plurality of filter frames within the filter structure for carrying respective filtration media thereon.

Preferably, the step of locating a plurality of filter frames within the filter structure includes the step of providing a plurality of radially-spaced concentric drums nested together and positioned in fluid receiving relation to the fluid inlet zone of the filter structure. Each of the filter frames being defined by an annular front peripheral edge of one of the drums and an annular back peripheral edge of an adjacent one of the drums.

Preferably, the step of driving the moving fluid stream includes the step of communicating fluid pumping means with the fluid outlet zone of the filter structure for creating a negative suction flow of fluid.

Preferably, the step of cleaning the filtration media includes the step of locating an elongated manifold in the fluid inlet zone of the filter structure. Another cleaning step includes providing suction means communicating with the manifold for creating a negative fluid flow, or suction, relative to the moving fluid stream. Yet another cleaning step includes attaching at least one outwardly extending tube to the manifold in operative communication with the manifold. The at least one tube penetrates the filter structure and operatively engages the upstream filter surface of respective filtration media to clean the filtration media.

BRIEF DESCRIPTION OF THE DRAWINGS

Some of the objects of the invention have been set forth above. Other objects and advantages of the invention will appear as the invention proceeds when taken in conjunction with the following drawings, in which.

DESCRIPTION OF THE PREFERRED EMBODIMENT AND BEST MODE

Figure 1:
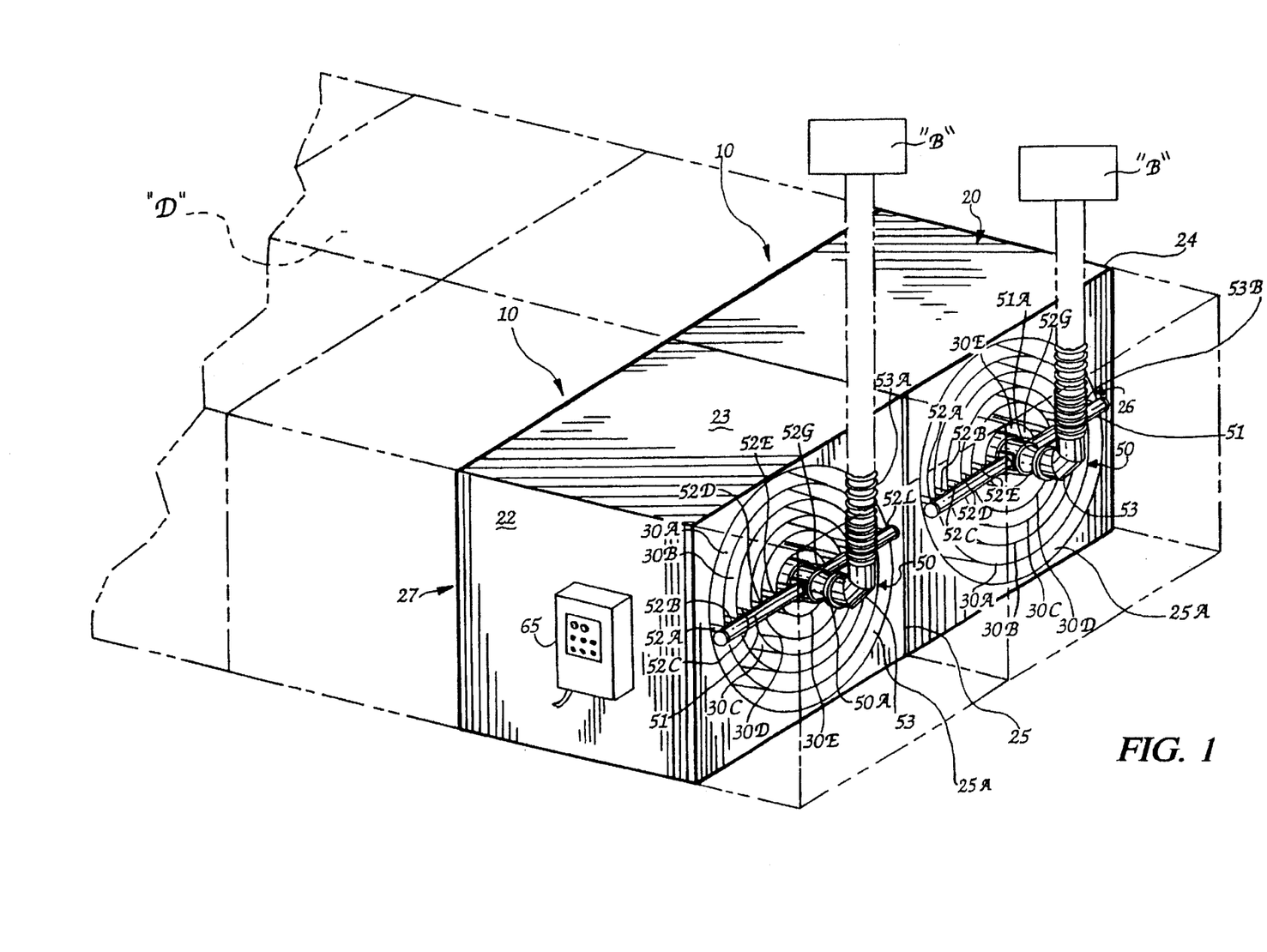
FIG. 1 is a perspective view showing two side-by-side fluid filters according to the present invention.

Referring now specifically to the drawings, a fluid filter according to the present invention is illustrated in FIG. 1 and shown generally at reference numeral 10. The fluid filter 10 is best utilized in industrial environments, such as textile plants and the like, for removing entrained particulate matter such as lint and dust from an air stream, and reducing the exposure to unclean air generated by equipment located within the facility. To accommodate relatively large facilities, two or more fluid filters 10 may be desirable, as shown in FIG. 1. Preferably, each fluid filter 10 is capable of filtering and cleaning between 20,000–50,000 cubic feet per minute (cfm) of air. According to one preferred embodiment, the fluid filter 10 has a filtering capacity of 23,500 cfm. In addition, the fluid filter 10 of the present invention may be used in other environments for filtering other fluids, such as gases and liquids.

Fluid Filter

Referring to FIG. 1, the fluid filter 10 includes a filter structure 20 for mounting the filter 10 on a supporting surface, such as the floor of a textile plant. According to one embodiment, the filter structure 20 includes a rear support frame 21 (See FIG. 14), a plurality of walls 22–25, a fluid inlet zone 26, and a fluid outlet zone 27. The front wall 25 of the filter structure 20 includes an opening 25A therein for receiving the fluid stream to be conveyed through the filter 10.

Preferably, when utilizing two fluid filters 10 in combination, as shown in FIG. 1, the filters 10 are not separated from each other by walls. The filter structure 20 may include only a rear support frame 21 and front wall 25 for mounting the filter 10 on the supporting surface. In another embodiment (not shown), a plurality of filters 10 may be positioned in rows and columns by stacking the filters vertically and positioning the filters side-by-side.

A filter cleaning device 50, described in detail below, is preferably located in the fluid inlet zone 26 of the filter structure 20. Conventional ducting "D" is operatively connected to the fluid outlet zone 27 of the filter structure 20. A fan or blower (not shown) communicates with the ducting "D" to create a suction force to draw and pull the air in a stream from the surrounding work area within the facility through the fluid filter 10 and ducting "D". While the fan is typically mounted outside of the work facility, a substantial portion of the ducting "D" is generally located within the facility and may be arranged and constructed according to any desired manner known in the art.

As shown in FIGS. 1–5, the fluid filter 10 includes a plurality of concentric solid-wall drums 30A–E nested together and radially spaced apart, and filtration media 31A–F positioned in filtering relation to the fluid inlet zone 26 of the filter structure 20. The filtration media 31A–F act to separate entrained particulate matter from the air stream as the air stream is pulled through the filter 10 by operation of the fan and ducting "D".

Preferably, the filtration media 31A–F are tubular cells constructed of a fabric material, such as felt. According to one embodiment, the felt weighs approximately 11–13 OPSY, and is formed of 100% 6 denier polyester. The felt is preferably about 0.085–0.098 inches thick. For added strength, the filtration media 31A–F may be singed and needled on respective downstream filter surfaces 39.

Each of the nested drums 30A–E are preferably conical, tapering slightly inwardly from the back end of the drum 30 to the front end of the drum 30. For example, the back end diameter of the drum 30A is approximately 74 inches (188 cm), while the front end diameter is approximately 70 inches (178 cm). Preferably, the space defined between adjacent drums 30A–E is about 4–8 inches (10–20 cm).

As best shown in FIGS. 2, 3, 4, and 5, each of the nested drums 30A–E includes a radially-extending annular flange 32 located on a back peripheral edge of the drum 30, and an annular channel 36 located on a front peripheral edge of the drum 30. A similarly constructed annular channel 36A is preferably located at the mouth of the front wall opening 25A, and together with the back flange 32 of the outermost drum 30A defines an outermost filter frame for carrying the filtration medium 31A thereon. According to one embodiment, the annular channel 36A has an outside diameter of about 82 inches (208 cm).

Figure 3:
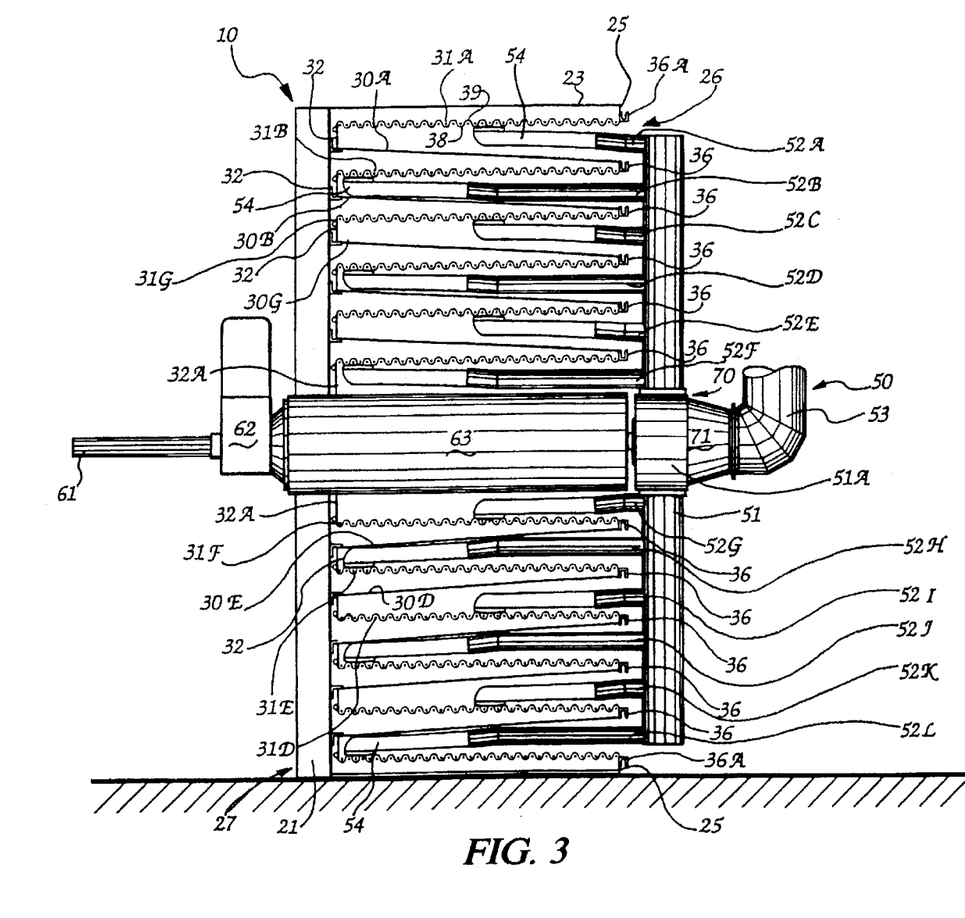
FIG. 3 is a cross-sectional view of the fluid filter showing the suction nozzles of the respective tubes in their innermost position, just prior to outward movement of the manifold.
Figure 4:
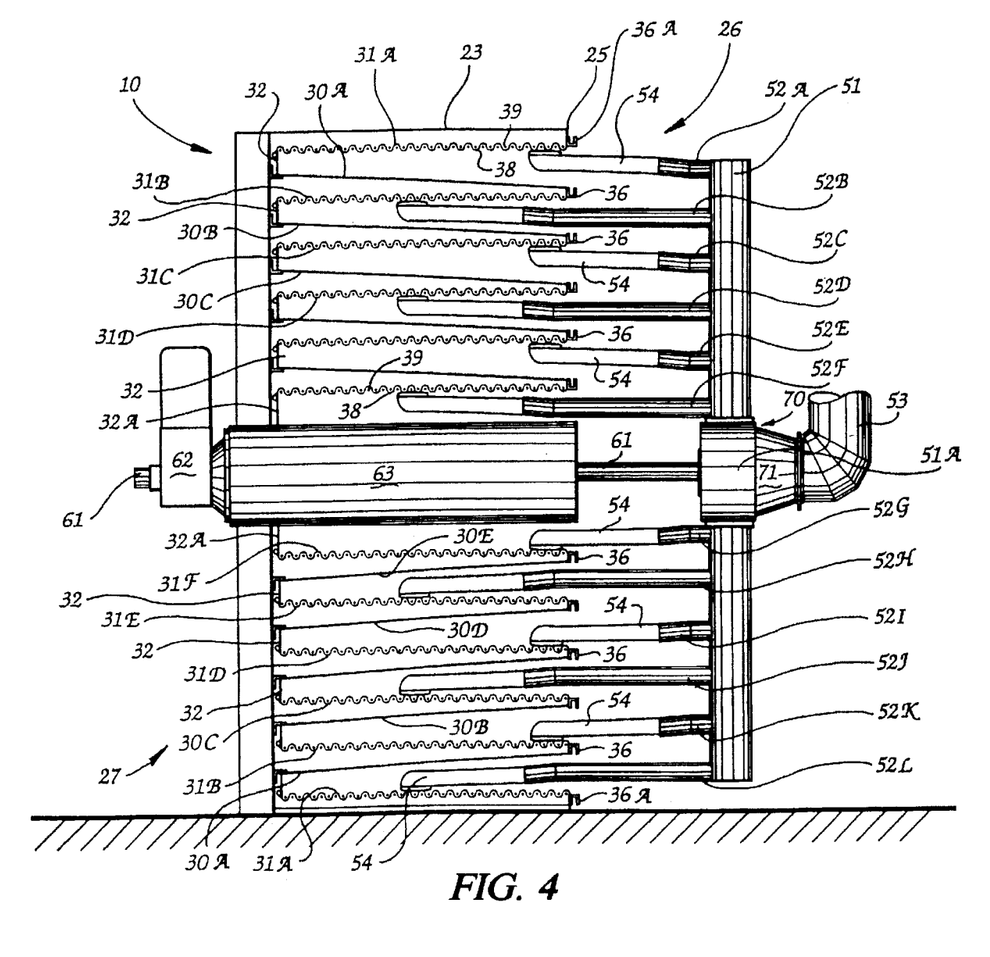
FIG. 4 is a cross-sectional view of the fluid filter showing the suction nozzles of the respective tubes in their outermost position, just prior to inward movement of the manifold.

The back flange 32 and front channel 36 of the respective drums 30A–E together define additional, nested filter frames for carrying the filtration media 31A–F within the filter structure 20. For example, the front channel 36 of the drum 30A and the back flange 32 of the adjacent drum 30B cooperate for attaching opposite ends of the filtration medium 31B to the fluid filter 10. As best shown in FIGS. 3 and 4, a similarly constructed flange 32A is located on the back end of a support tube 63 centrally disposed within the filter structure 20. Thus, the front channel 36 of the drum 30E together with the flange 32A defines an innermost frame for carrying the filtration medium 31F thereon. Preferably, the fluid filter 10 includes 4–8 nested filter frames and corresponding filtration media.

Figure 5:
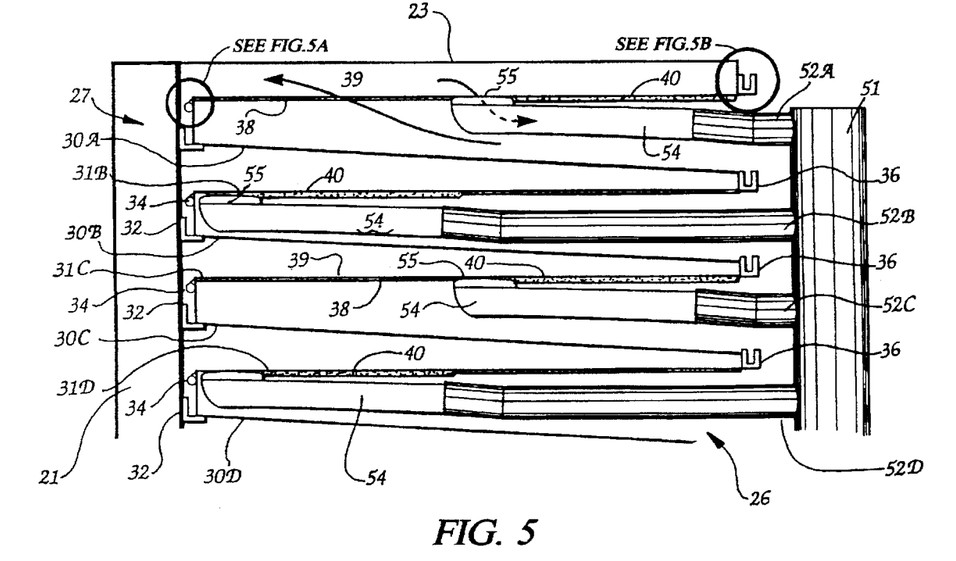
FIG. 5 is a fragmentary cross-sectional view of the fluid filter showing in detail the attachment of respective ends of the filtration medium to the fluid filter.
Figure 5A:
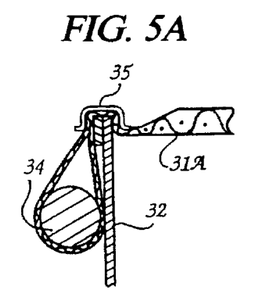
Figure 5B:
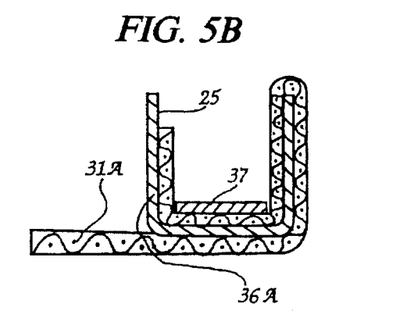

The attachment of a single filtration medium 31A to the channel 36A of the front wall 25 and the back flange 32 of the outermost drum 30A is illustrated in detail in FIG. 5. Each of the filtration media 31A–F include identical elements, and are attached to the front channel 36 and back flange 32 of respective drums 30A–F in an identical manner. As shown, the filtration medium 31A includes an annular elastic cord 34 connected to the back end of the filtration medium 31A which extends over the top edge of the back flange 32 of the drum 30A. A clamp 35, such as a T-bolt latch V-band coupling as manufactured and sold by Clampco, is fitted over the back flange 32 to securely attach the back end of the filtration medium 31A to the drum 30A. The front end of the filtration medium 31A is attached to the channel 36A located at the mouth of the opening 25A in the front wall 25 of the filter structure 20. A flat retainer band 37 is preferably located within the channel 36A to securely hold the front end of the filtration medium 31A to the channel 36A. The front end attachment of the filtration media 31B–F to the channels 36 of the drums 30A–E is identical to that described above with reference to the channel 36A of the front wall 25.

Figure 2:
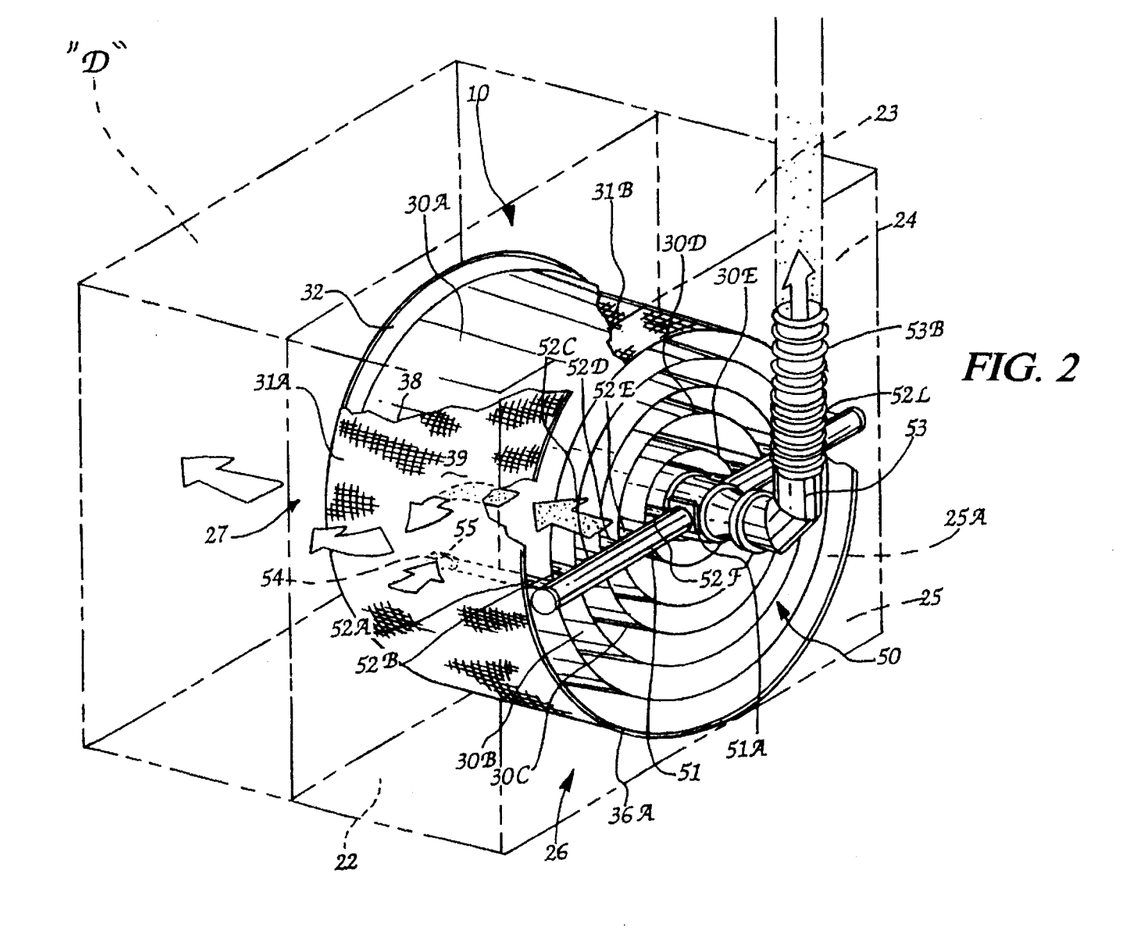
FIG. 2 is a perspective view of a single fluid filter showing the outer surfaces of the filter broken away, and the directional movement of air flow through the filtration medium and suction nozzle.

As indicated by the direction arrows shown in FIGS. 2 and 5, the air stream moves through the filtration media 31A–F from an upstream surface 38 to a downstream surface 39 of the respective filtration media 31A–F. As a result, a thin layer 40 of particulate matter accumulates over a period of time on the respective upstream filter surfaces 38 (See FIG. 5). To ensure proper and efficient operation of the fluid filter 10, this layer 40 must be periodically cleaned away, as discussed in detail below.

Filter Cleaning Device

As best illustrated in FIGS. 1–4, the filter cleaning device 50 is located in the fluid inlet zone 26 of the filter structure 20, and includes a hollow elongated manifold 51 having several spaced-apart aluminum tubes 52A–L attached along the length of the manifold 51. The tubes 52A–L extend outwardly from the manifold 51 and reside within the space defined between the adjacent drums 30A–E. The manifold 51 is operatively connected to conduit 53 which leads to a fan or blower "B" for creating a negative flow of air, or suction, through the manifold 51 and tubes 52A–L.

Figure 6:
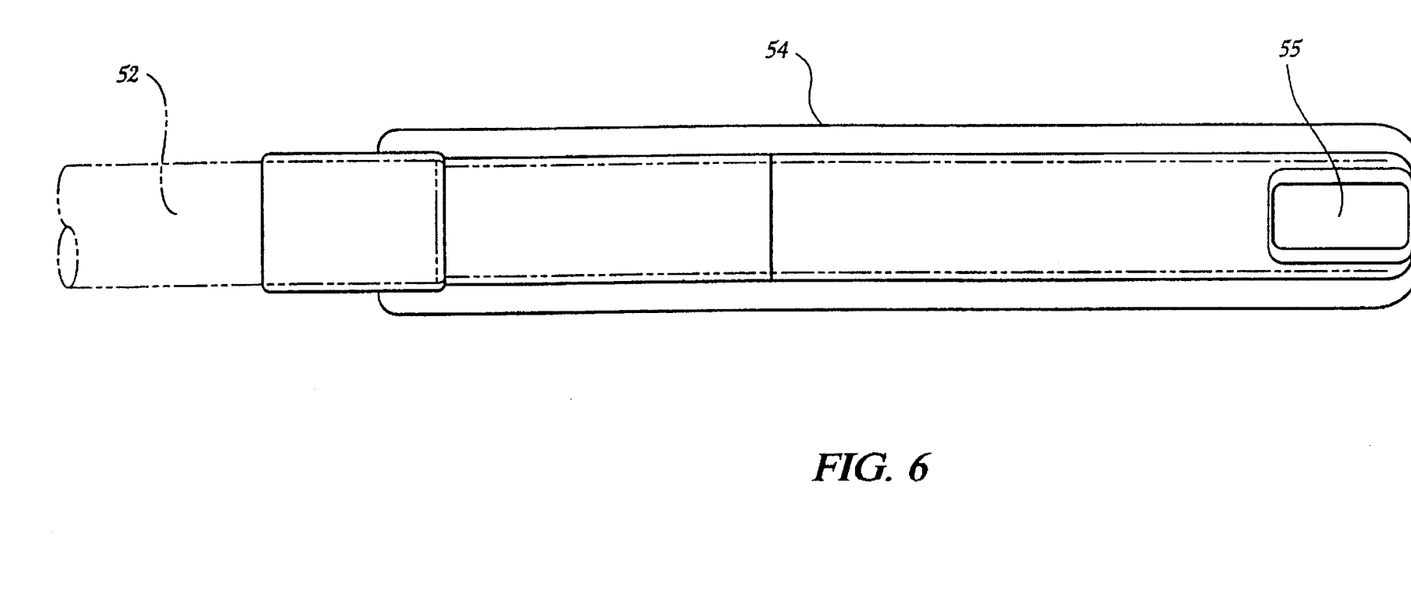
FIG. 6 is a bottom view of a suction nozzle showing the opening formed in the head of the nozzle for engaging the filtration medium.

Each tube 52A–L preferably includes a flexible, polyethylene suction nozzle 54 attached at one end thereof for engaging the upstream filter surface 38 of the respective filtration media 31A–F. As best shown in FIG. 5, each tube 52A–L preferably has an upward bend of approximately 2 degrees for permitting the flexible nozzle 54 to bear against and follow the contours of the respective filtration media 31A–F during cleaning. The negative air flow through the tubes 52A–L and corresponding suction nozzles 54 acts to clean away the layer 40 of particulate matter captured on the upstream filter surfaces 38 of the filtration media 31A–F, thus increasing the fluid flow through the filtration media 31A–F and improving the overall filtering efficiency and capacity. As shown in FIG. 6, each suction nozzle 54 preferably has a opening 55 formed at the head of the nozzle 54 for defining a zone of accelerated negative air flow. FIGS. 2 and 5 best illustrate the directional movement of negative air flow through the opening 55 of the respective suction nozzles 54, and the simultaneous movement of the air stream through the filtration media 31A–F.

Figure 7:
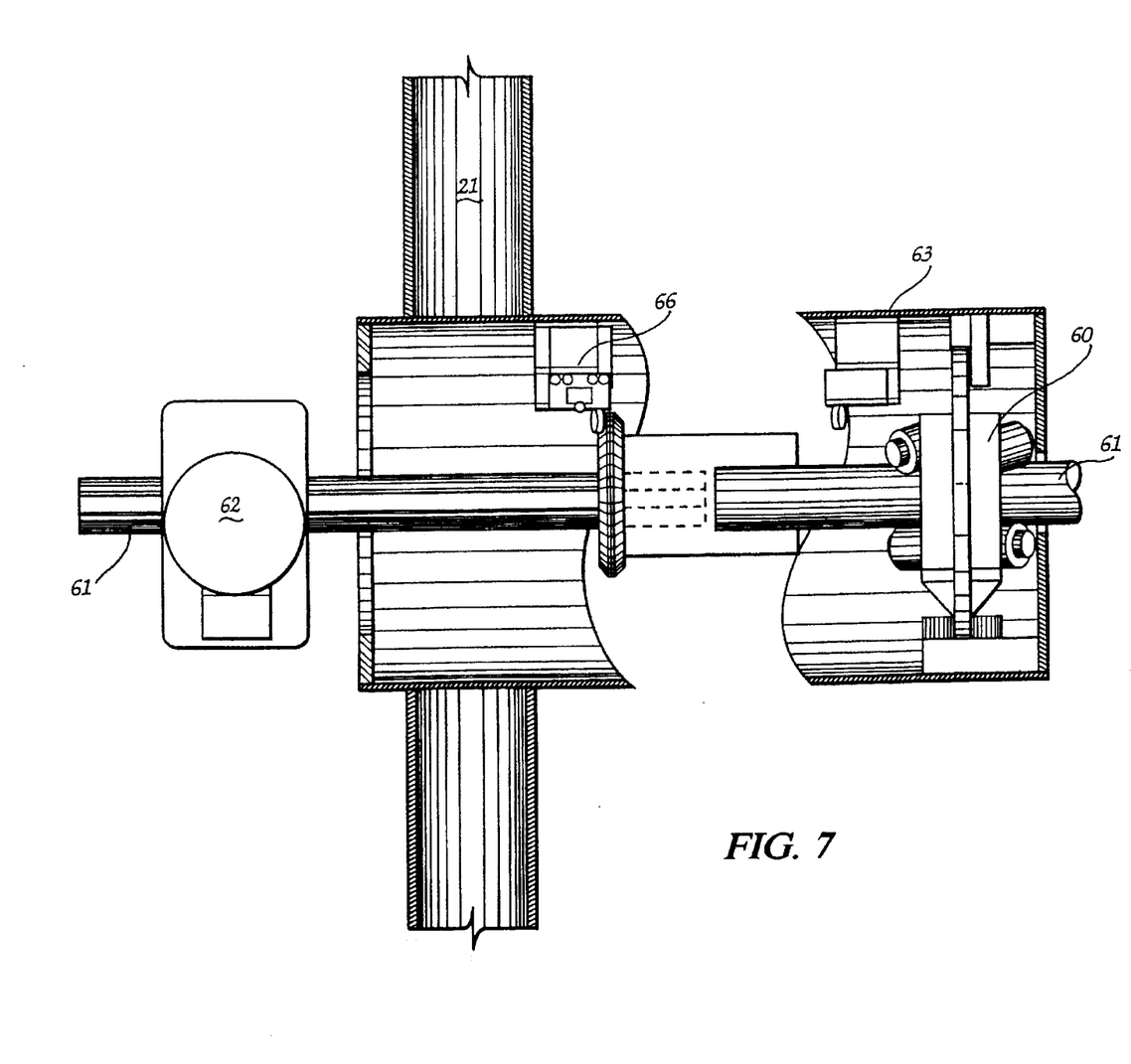
FIG. 7 is a cross-sectional and fragmentary view of the support tube showing the actuator and drive shaft.

As shown in FIG. 7, the cleaning device 50 further includes an actuator 60 centrally disposed within the filter structure 20 for cooperating with the manifold 51 to rotate and reciprocate the suction nozzles 54 relative to the filtration media 31A–F. Preferably, the actuator 60 is a "Roh'lix" linear actuator manufactured and sold by Zero Max. The actuator 60 rotates on a drive shaft 61 and converts rotary motion of the drive shaft 61 into linear motion. The drive shaft 61 is operatively associated at one end thereof with a gear motor 62, and connected at the opposite end to a central portion 51A of the manifold 51. The gear motor 62 rotates the drive shaft 61, and triggers linear movement of the drive shaft 61 and manifold 51.

Figure 14:
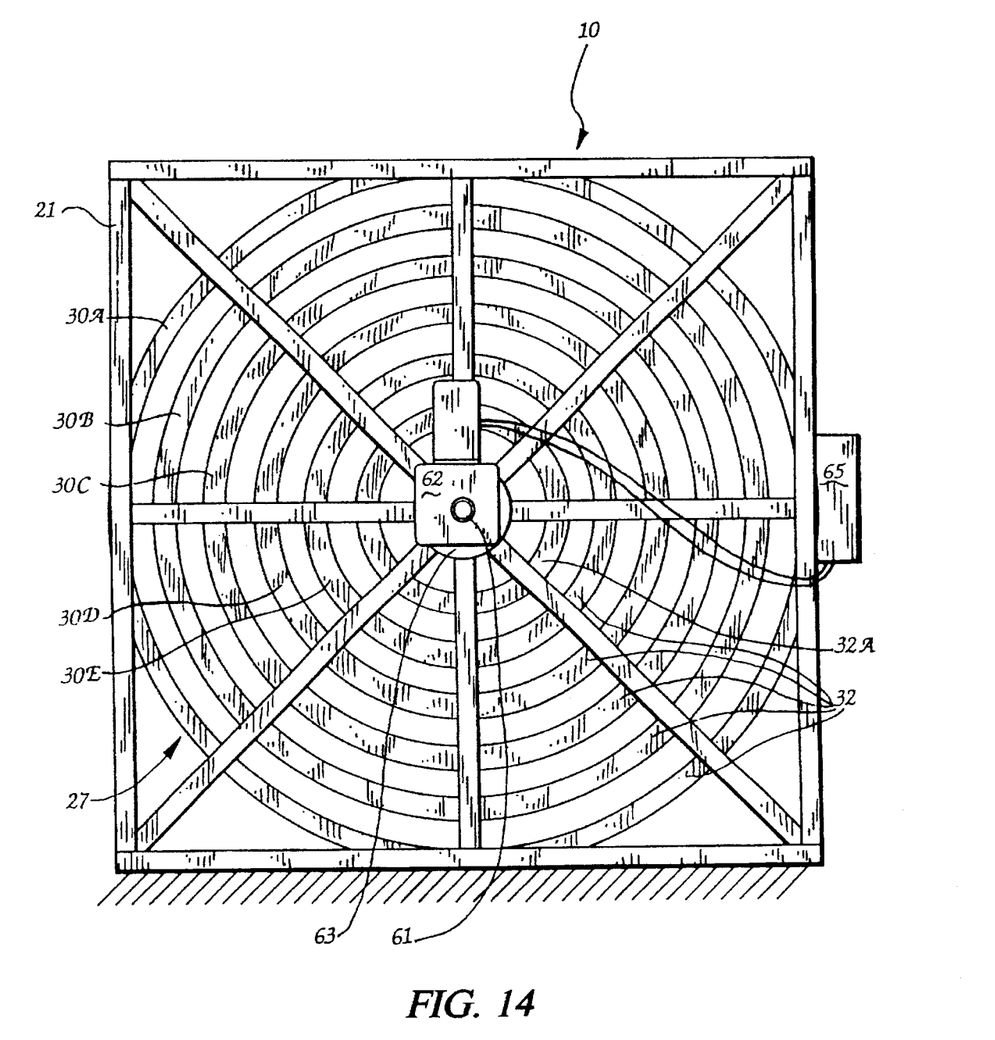
FIG. 14 is a back elevation of the fluid filter.

The drive shaft 61 and actuator 60 are housed in the hollow support tube 63 attached to the rear support frame 21 of the filter structure 20. As best shown in FIG. 14, a control box 65 is mounted on the side of the filter structure 20 for controlling operation of the gear motor 62 and drive shaft 61.

Preferably, the actuator 60 has a linear lead of between 0.025 inches per revolution to 6.00 inches per revolution. Generally, the lead may be as great as three times the diameter of the drive shaft 61, and may be set for providing linear motion as fast as 70 inches per second. Limit switches 66 electrically associated with the control box 65 operate to control the degree of forward and rearward movement of the drive shaft 61 and manifold 51.

Figure 8:
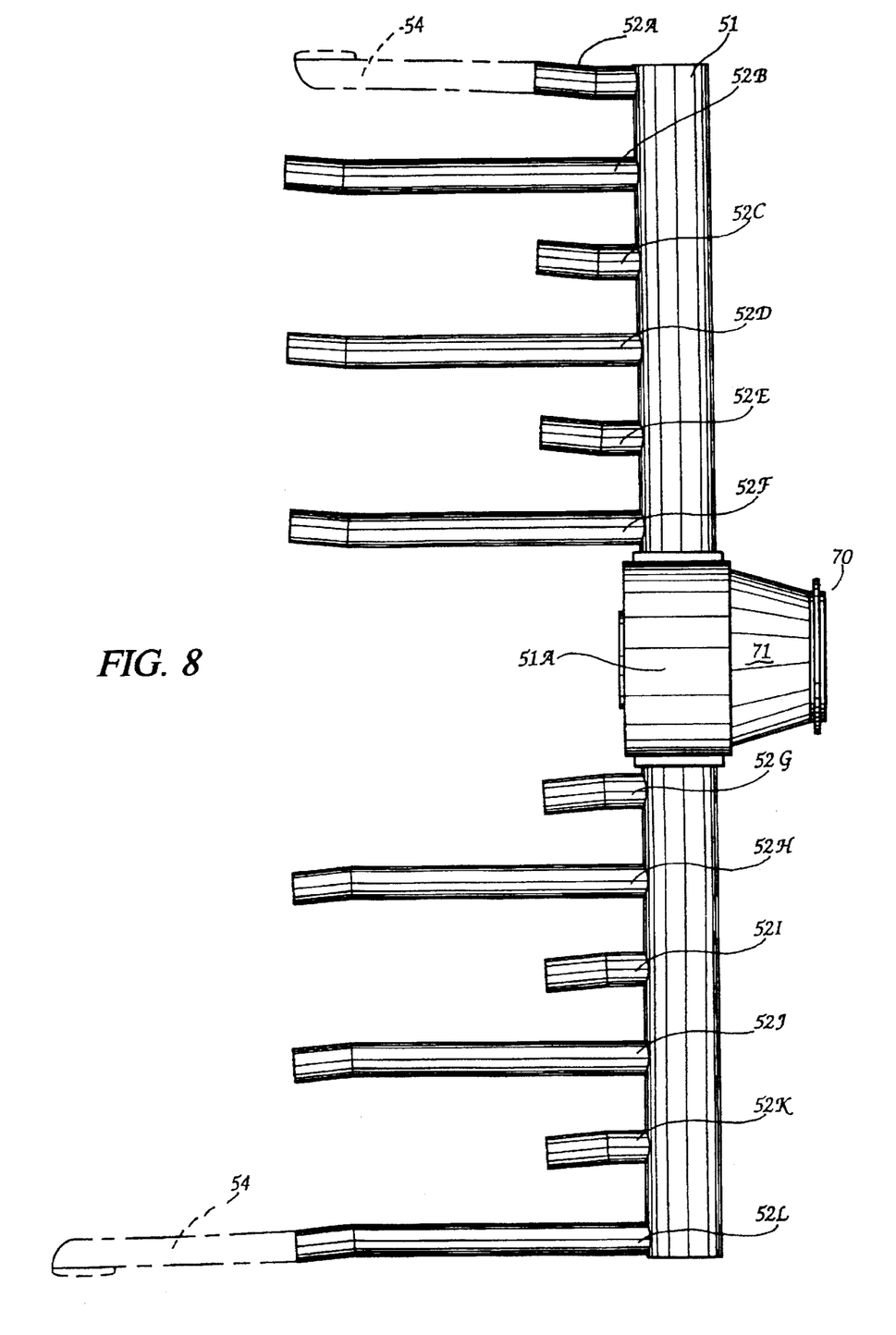
FIG. 8 is a fragmentary elevational view of the manifold and tubes showing a single set of suction nozzles in phantom.

The manifold 51 preferably includes two tubes 52A–L and corresponding suction nozzles 54 for cleaning each one of the filtration media 31A–F. As best shown in FIG. 8, one of the two tubes 52A–L is relatively short for cleaning a front half of the filtration media 31A–F, while the second tube 52A–L is relatively long for cleaning a back half of the filtration media 31A–F. For example, tubes 52A and 52L with corresponding suction nozzles 54 cooperate to collectively clean the entire upstream filter surface 38 of the filtration medium 31A. Each of the tubes 52A and 52L and suction nozzles 54 moves in a spiral path, operatively engaging the upstream filter surface 38 of the front and back half of the filtration medium 31A, respectively. According to one embodiment, the relatively short tubes are each about 8–10 inches long, and the relatively long tubes are each about 22–26 inches long.

Thus, as the manifold 51 rotates and simultaneously moves between the position shown in FIG. 3 and that shown in FIG. 4 by operation of the drive shaft 61 and actuator 60, the entire upstream filter surface 38 of each of the filtration media 31A–F is cleaned by the respective pairs of relatively long and relatively short tubes 52A–L and corresponding suction nozzles 54.

Figure 9:
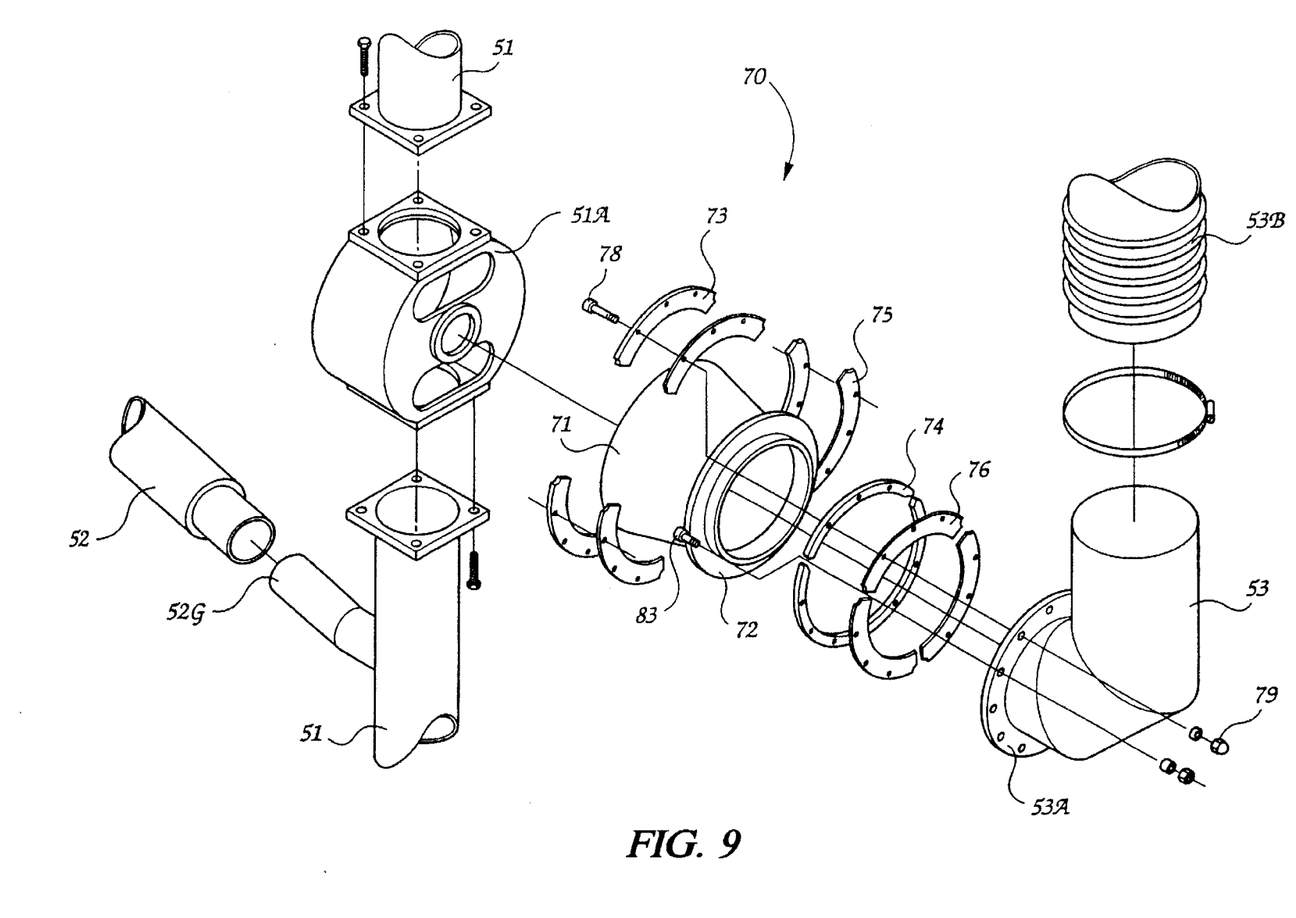
FIG. 9 is a fragmentary exploded view of the swivel assembly.
Figure 10:
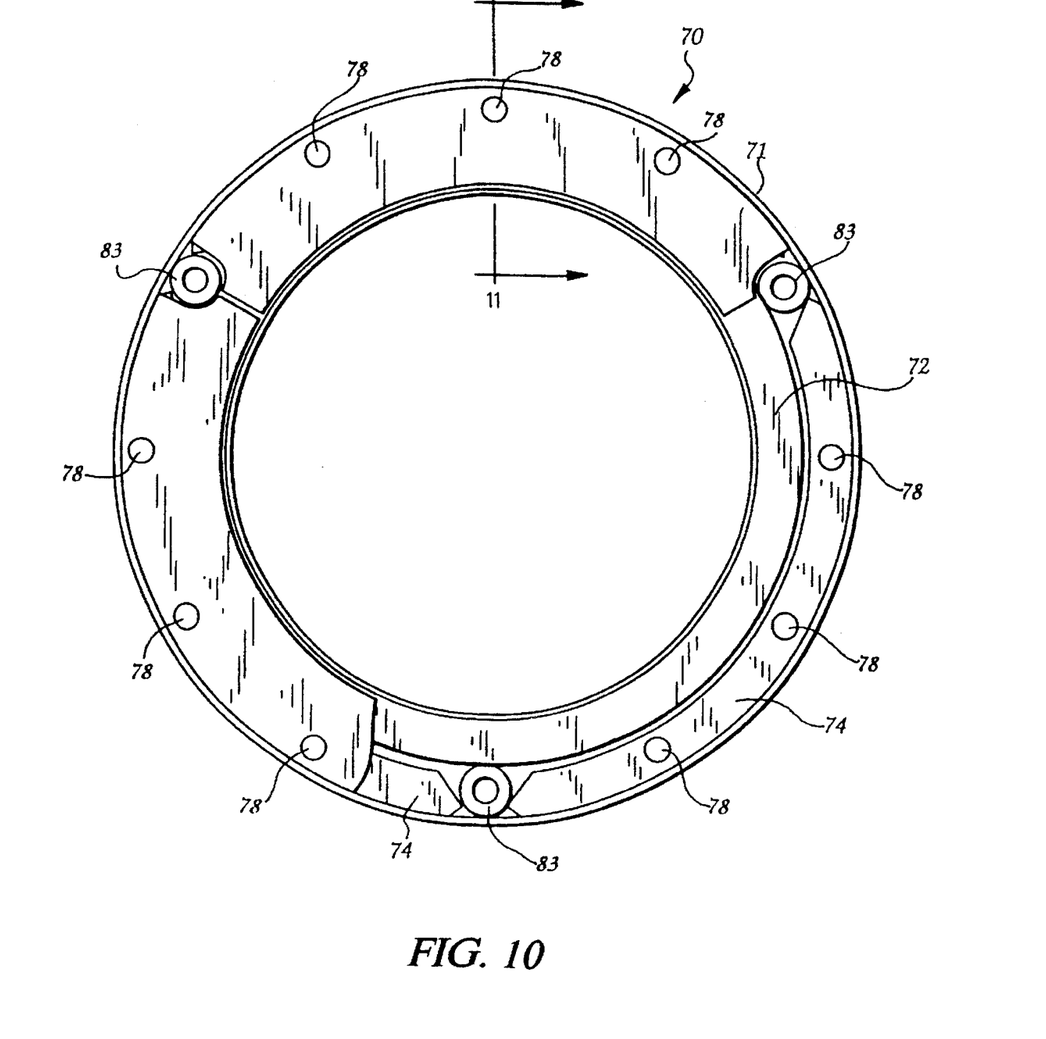
FIG. 10 is a front end view of the swivel assembly.
Figure 11:
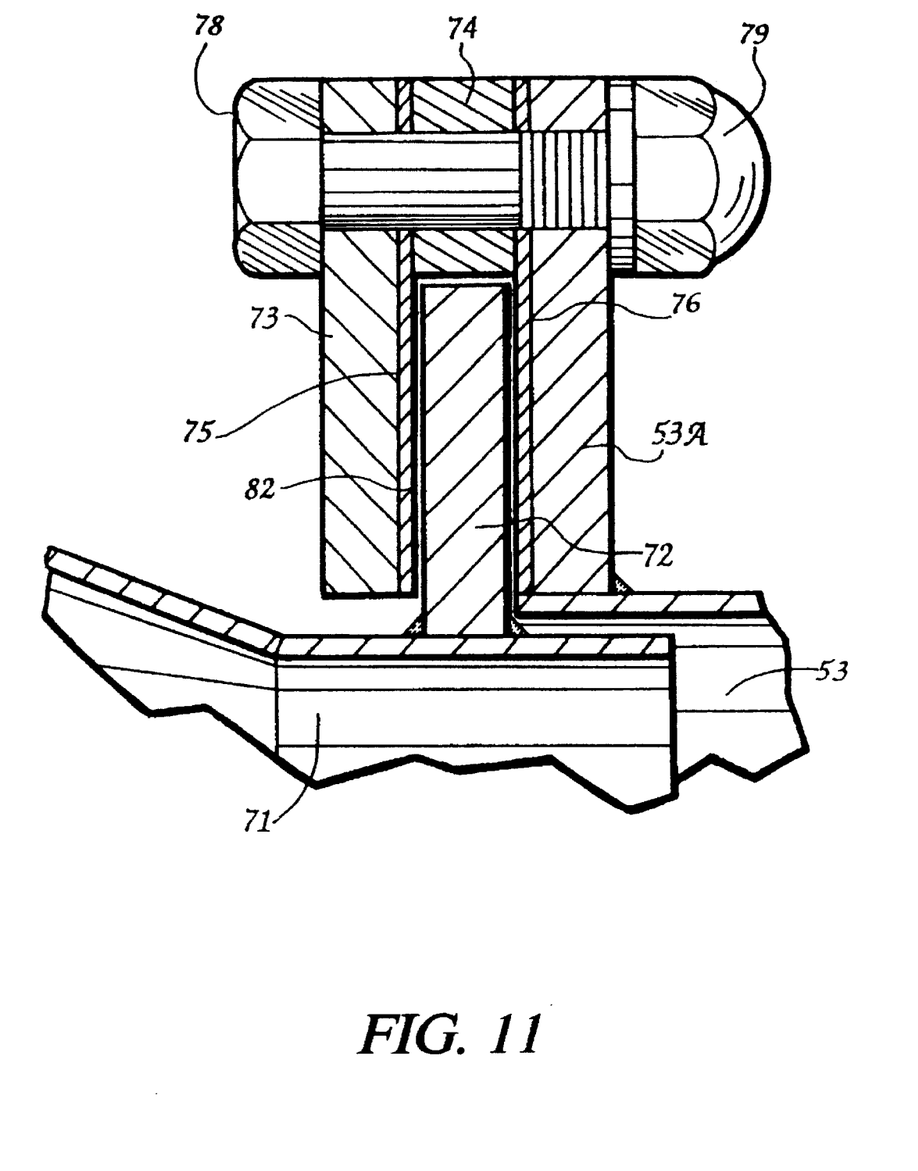
FIG. 11 is an enlarged, fragmentary cross-sectional view taken substantially along lines 11—11 of FIG. 10, and showing the attachment of the cone to the conduit.

Referring now to FIGS. 9–12, a swivel assembly (or rotary union) 70 is located at the central portion 51A of the manifold 51, and functions to permit rotational movement the manifold 51 without causing substantial movement of the conduit 53. As shown in FIG. 9, the swivel assembly 70 includes a hollow cone 71 and welded annular flange 72, first and second rings 73 and 74, and first and second teflon washers 75 and 76. The cone 71 is fixedly connected at one end to the central portion 51A of the manifold 51, and connected at the opposite end to the conduit 53. As best shown in FIG. 11, the rings 73 and 74 and washers 75 and 76 are held together on respective sides of the annular cone flange 72 by several threaded bolts 78 and nuts 79, only one pair of which is shown in FIG. 9. Each bolt 78 extends through the rings 73, 74 and washers 75, 76, and through a connecting flange 53A welded to the conduit 53. The ring 74 and washers 75 and 76 together define a space 82 for permitting rotational movement of the cone flange 72 within the space 82 without causing substantial movement of the conduit 53.

Figure 12:
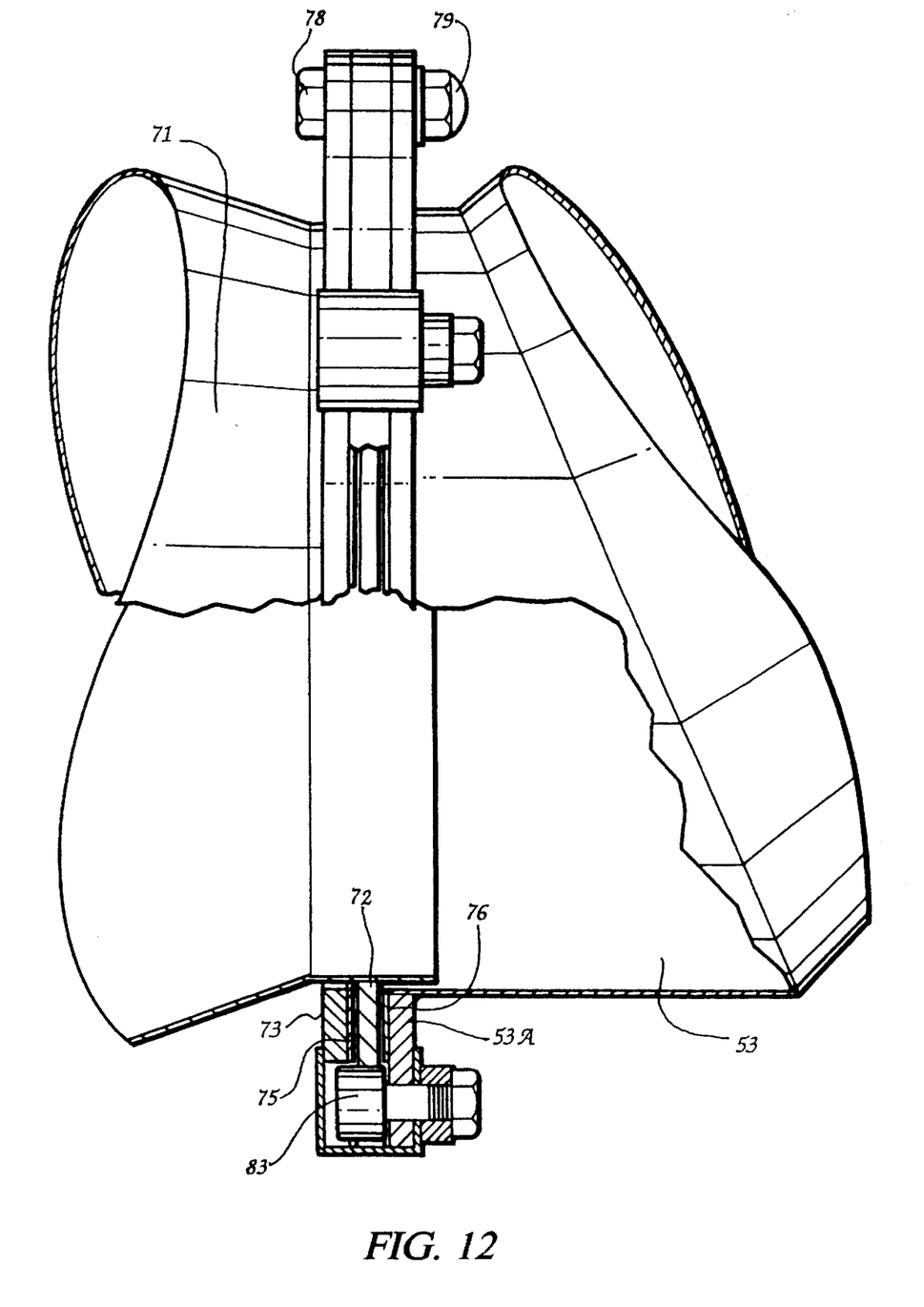
FIG. 12 is an enlarged fragmentary view of the cone and conduit with a portion of the outer surface of each broken away, and showing the roller attachment in cross-section.

As shown in FIGS. 10 and 12, rollers 83 preferably engage the top edge surface of the cone flange 72 for promoting rotational movement of the cone flange 72 within the space 82. According to one embodiment, the swivel assembly 70 includes nine sets of nuts and bolts 78 and 79, and three rollers 83, as shown in FIG. 11.

Figure 13:
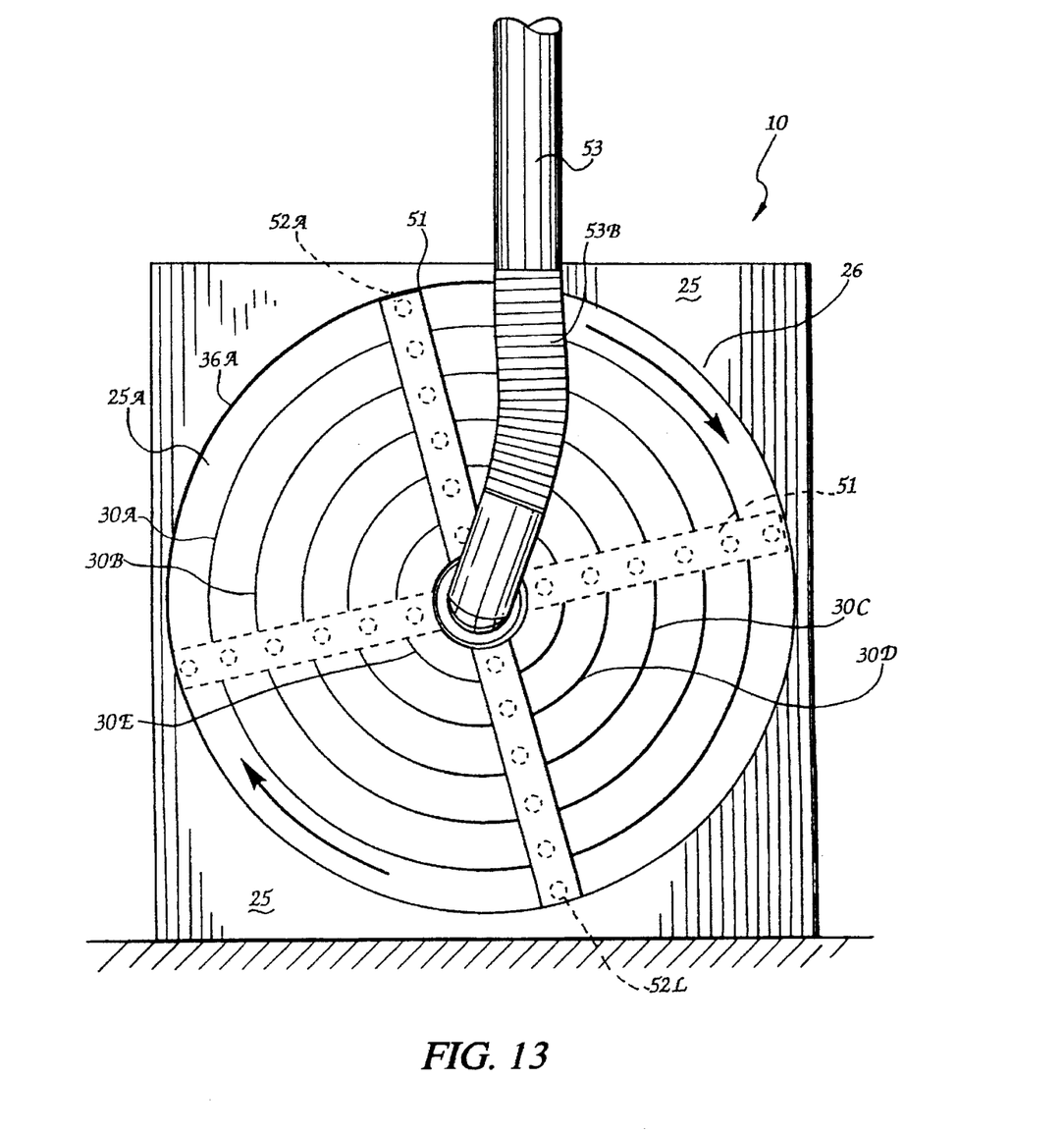
FIG. 13 is a front elevation of the fluid filter with parts in phantom, indicating the rotational movement of the manifold and showing the slight degree of movement of the conduit.

Preferably, the conduit 53 further includes a flexible section 53B for allowing slight pivoting movement of the conduit 53 as the cone flange 72 revolves within the space 82. FIG. 13 illustrates the degree of pivoting movement of the conduit 53 as the manifold 51 rotates about a lateral axis defined by the drive shaft 61. In addition, the flexible section 53B allows lateral reciprocating movement of the manifold 51 relative to the fluid filter 10.

In an alternative embodiment of the invention, the fluid filter 10 does not include a filter cleaning device 50, as described above. Instead, the filtration media 31A–F are periodically replaced, as necessary, with new filtration media. This embodiment has particular application in environments where relatively little particulate accumulates on the filtration media over a relatively long period of time.

A fluid filter and method of filtering entrained particulate matter from a moving fluid stream is described above. Various details of the invention may be changed without departing from its scope. Furthermore, the foregoing description of the preferred embodiment of the invention and the best mode for practicing the invention are provided for the purpose of illustration only and not for the purpose of limitation—the invention being defined by the claims.

We claim:

1. A fluid filter for separating entrained particulate matter from a moving fluid stream, said fluid filter comprising:
   (a) a filter housing including a fluid inlet and a fluid outlet for conveying the moving fluid stream therethrough;
   (b) a plurality of concentric solid wall filter frees positioned in and supported by said filter housing in radially spaced-apart relation to each other, each of said filter frames deeming between adjacent filter frames a generally axially directed fluid passage from the fluid inlet downstream to the fluid outlet; and (c) a filtration medium positioned in each fluid passage for receiving the fluid stream from the fluid inlet through the filter medium to the fluid outlet for accumulating an overlying layer of particulate matter on an upstream filter surface thereof.

2. A fluid filter according to claim 1, wherein each of said plurality of drums has a conical peripheral surface.

3. A fluid filter according to claim 2, wherein said filtration medium is tubular and extends along the length of a respective one of the respective drums, said filtration medium being attached at one end thereof to a respective annular front peripheral edge of the drum and attached at the opposite end of the drums to an annular flange located at a back peripheral edge of an adjacent one of the drums.

4. A fluid filter according to claim 1, and including fluid pumping means communicating with the fluid outlet of said filter housing and creating a pressure differential on opposite sides of said filtration medium for inducing movement of the fluid stream through said filter housing from the fluid inlet through the filtration medium and to the fluid outlet.

5. A fluid filter according to claim 1, and including a filter cleaning device for removing the overlying layer of particulate matter from the upstream filter surface of said filtration medium.

6. A fluid filter according to claim 4, wherein said filter cleaning device includes suction means, and an elongated manifold communicating with said suction means, said manifold located in the fluid inlet of said filter and having a plurality of rotatably-mounted suction tubes each having a respective nozzle thereon, at least one of said suction tube nozzles engaging the upstream filter surface of said filtration medium of each of said drums for removing accumulated particulate matter.

7. A fluid filter according to claim 6, and including drive means for driving said suction tubes axially along the length of the filtration medium.

8. A fluid filter according to claim 7, wherein said drive means further includes reciprocating means operatively associated with said manifold for providing reciprocating axial movement of said tubes along the length of the filtration media.

9. A fluid filter according to claim 6, wherein said manifold includes two suction tubes attached thereto for cleaning said filtration medium, said two suction tubes being spaced-apart along the length of said manifold by a distance corresponding generally to the diameter of the filtration medium to be cleaned, whereby an entire circumferential portion of the filtration medium is cleaned upon 180 degree rotation of said manifold about said axis of rotation.

10. A fluid filter for separating entrained particulate matter from a moving fluid stream, said fluid filter comprising:

(a) a filter housing including a fluid inlet and a fluid outlet for conveying the moving fluid stream therethrough;

(b) first and second solid wall concentric filter frames positioned in and supported by said filter housing in radially spaced-apart relation to each other, said first and second filter frames defining between them a generally axially directed fluid passage from the fluid inlet downstream to the fluid outlet; and (c) a filtration medium positioned in the fluid passage for receiving the fluid stream from the fluid inlet through the filter medium to the fluid outlet for accumulating an overlying layer of particulate matter on an upstream filter surface thereof.

11. A fluid filter according to claim 10, wherein said filtration medium comprises a tubular fabric, and further wherein said filter frames include tension means for holding the filtration medium in a tensioned condition in the fluid passage.

12. A fluid filter according to claim 11, wherein said tension means comprises:

(a) a first annular flange formed on one end of said first drum and a second annular flange formed on an opposed end of said second drum; and (b) clamping means for clamping opposing ends of said tubular fabric filtration medium onto the first and second annular flanges.

13. A fluid filter according to claim 12, wherein said clamping means comprises an elastic cord.

* * * * *